(12) United States Patent
Klas et al.

(10) Patent No.: US 6,343,070 B1
(45) Date of Patent: Jan. 29, 2002

(54) METHODS FOR REDUCING CHANNEL ACQUISITION TIMES IN A RADIOTELEPHONE COMMUNICATIONS SYSTEM AND RELATED MOBILE TERMINALS

(75) Inventors: Kevin Klas, Holly Springs; Raymond C. Henry, Jr., Raleigh, both of NC (US)

(73) Assignee: Ericcson Inc., Research Triangle Park, NC (US)

( * ) Notice: Subject to any disclaimer, the term of this patent is extended or adjusted under 35 U.S.C. 154(b) by 0 days.

(21) Appl. No.: 09/093,215

(22) Filed: Jun. 8, 1998

(51) Int. Cl.[7] .................................................. H04Q 7/00
(52) U.S. Cl. ..................... 370/329; 370/441; 370/341; 370/342; 455/450; 455/455
(58) Field of Search ................................ 370/328, 329, 370/330, 335, 336, 341, 342, 343, 344, 345, 441, 442; 455/422, 426, 450, 451, 452, 453, 454, 455

(56) References Cited

U.S. PATENT DOCUMENTS

| | | | |
|---|---|---|---|
| 5,640,675 A | | 6/1997 | Pinault et al. |
| 5,809,427 A | * | 9/1998 | Perreault et al. ............ 455/513 |
| 5,950,131 A | * | 9/1999 | Vilmur ........................ 455/434 |
| 6,026,300 A | * | 2/2000 | Hicks ......................... 455/435 |
| 6,119,003 A | * | 9/2000 | Kukkohovi ................. 455/435 |
| 6,137,789 A | * | 10/2000 | Honkasalo .................. 370/342 |

FOREIGN PATENT DOCUMENTS

| | | |
|---|---|---|
| DE | 197 27 564 C 1 | 6/1997 |
| WO | WO 98/10617 | 3/1998 |

* cited by examiner

Primary Examiner—Ajit Patel
Assistant Examiner—Bob A. Phunkulh
(74) Attorney, Agent, or Firm—Myers Bigel Sibley & Sajovec (57) ABSTRACT

A method of acquiring communications with a communications system having a plurality of communications channels includes storing a previously acquired communications channel in user terminal memory. The user terminal searches for the previously acquired communications channel in said user terminal memory, and acquires the previously acquired communications channel when the previously acquired communications channel is available. Channel acquisition times can thus be reduced.

32 Claims, 8 Drawing Sheets

METHODS FOR REDUCING CHANNEL ACQUISITION TIMES IN A RADIOTELEPHONE COMMUNICATIONS SYSTEM AND RELATED MOBILE TERMINALS

FIELD OF THE INVENTION

The present invention relates to the field of communications and more particularly to radiotelephone communications.

BACKGROUND OF THE INVENTION

Cellular communications systems are commonly employed to provide voice and data communications to a plurality of mobile units or subscribers. Analog cellular systems, such as designated AMPS, ETACS, NMT-450, and NMT-900, have been deployed successfully throughout the world. Digital cellular systems such as designated IS-136 in North America and the pan-European GSM system have also been introduced. These systems, and others, are described, for example, in the book titled *Cellular Radio Systems* by Balston, et al., published by Artech House, Norwood, Mass., 1993.

Figure 1:
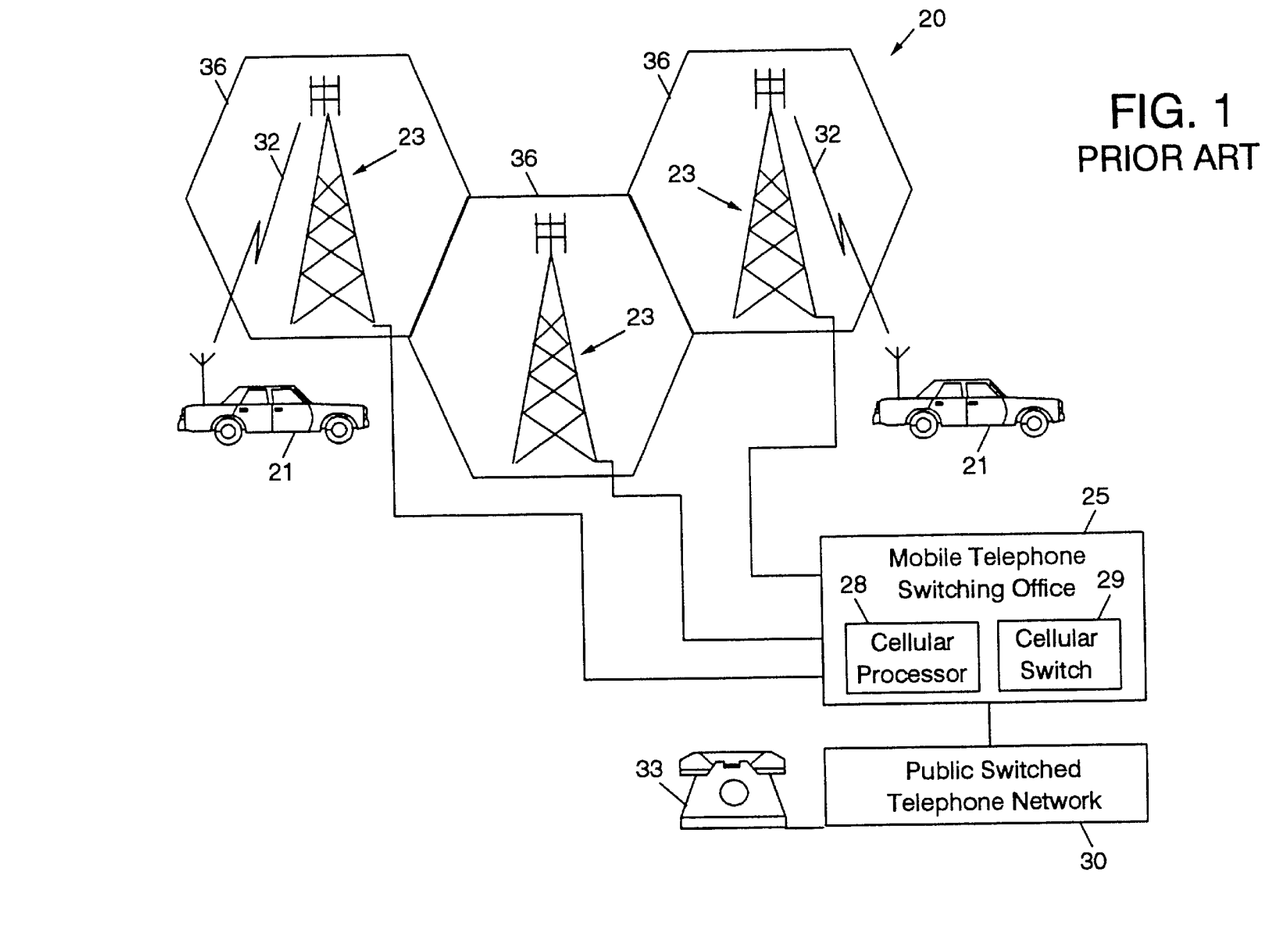
FIG. 1 is a schematic diagram of a cellular radiotelephone communications system according to the prior art.

As illustrated in FIG. 1, a cellular communication system 20 as in the prior art includes one or more mobile stations or units 21, one or more base stations 23 and a mobile telephone switching office (MTSO) 25. Although only three cells 36 are shown in FIG. 1, a typical cellular network may comprise hundreds of base stations, thousands of mobile stations and more than one MTSO. Each cell will have allocated to it one or more dedicated control channels and one or more voice channels. A typical cell may have, for example, one control channel, and 21 voice/data, or traffic, channels. The control channel is a dedicated channel used for transmitting cell identification and paging information. The traffic channels carry the voice and data information.

The MTSO 25 is the central coordinating element of the overall cellular network 20. It typically includes a cellular processor 28, a cellular switch 29 and also provides the interface to the public switched telephone network (PSTN) 30. Through the cellular network 20, a duplex radio communication link 32 may be effected between two mobile stations 21 or, between a mobile station 21 and a landline telephone user 33. The function of the base station 23 is commonly to handle the radio communication with the mobile station 21. In this capacity, the base station 23 functions chiefly as a relay station for data and voice signals. The base station 23 also supervises the quality of the link 32 and monitors the received signal strength from the mobile station 21.

Frequency reuse (Frequency Division Multiple Access or FDMA) is commonly employed in cellular technology wherein groups of frequencies are allocated for use in cells which define regions of limited geographic coverage. Cells containing equivalent groups of frequencies are geographically separated to allow mobile units in different cells to simultaneously use the same frequency without interfering with each other. By so doing many thousands of subscribers may be served by a system of only several hundred frequencies.

In the United States, for example, Federal authorities have allocated to cellular communications a block of the UHF frequency spectrum further subdivided into pairs of narrow frequency bands called channels. Channel pairing results from the frequency duplex arrangement wherein the transmit and receive frequencies in each pair are offset by 45 MHz.

At present there are 832, 30-KHz wide, radio channels allocated to cellular mobile communications in the United States.

To address the capacity limitations of this analog system, a digital transmission standard has been provided, designated IS-136, wherein these frequency channels are further subdivided into time slots. The division of a frequency into a plurality of time slots wherein a channel is defined by a frequency and a time slot is known as Time Division Multiple Access (TDMA). Accordingly, multiple channels can be defined on a single frequency.

More recently, Code Division Multiple Access (CDMA) standards have been developed wherein a communications channel is defined by a carrier frequency and a pseudonoise (PN) sequence. Accordingly, multiple communications channels can be provided on a common carrier frequency at the same time wherein each channel on the carrier frequency has a different PN sequence. For example, a CDMA standard for a cellular radiotelephone system is provided by the North American Code Division Multiple Access (CDMA) Digital Cellular (IS-95) standard.

In any of the cellular radiotelephone systems and/or standards discussed above, a user terminal such as a radiotelephone may first need to acquire a channel before communications services can be provided by the cellular radiotelephone system. The acquisition of a channel may require the user terminal to scan a plurality of channels to find a channel that can be used. This scan may result in a delay before communications services are provided. This delay may be especially significant in a CDMA radiotelephone system where scanning for a channel requires first scanning for an available carrier frequency and then scanning for an available PN sequence within the carrier frequency.

In an IS95 CDMA radiotelephone system, for example, each channel on a carrier frequency is encoded with a PN sequence having a length of 32768 bits. Each of the base stations within a system can use the same carrier frequency and the same PN sequence shifted by an integer multiple of 64 bits and this shift is known as a PN sequence offset. The combination of the carrier frequency, the PN sequence, and the PN sequence offset uniquely identify the base station/cell being monitored.

When attempting to acquire a CDMA channel, the user terminal may first scan a specified list of carrier frequencies in the order specified by Section 6.1.1.1 of the IS-95 specification shown below in Table 1.

TABLE 1

| CLASS | BAND | SPECIFIED LIST OF CDMA CHANNELS |
|---|---|---|
| 0 | A side | 283, 691 |
| 0 | B side | 384, 777 |
| 1 | A | 25, 50, 75, 100, 125, 150, 175, 200, 225, 250, 275 |
| 1 | D | 325, 350, 375 |
| 1 | B | 425, 450, 475, 500, 525, 550, 575, 600, 625, 650, 675 |
| 1 | E | 725, 750, 775 |
| 1 | F | 825, 850, 875 |
| 1 | C | 925, 950, 975, 1000, 1025, 1050, 1075, 1100, 1125, 1150, 1175 |

Upon finding a carrier frequency, the user terminal then searches for one of 512 possible PN sequences on that carrier frequency. If a valid PN sequence is not found on the carrier frequency, the user terminal then scans to find a next carrier frequency which is then searched for a PN sequence. This process may continue through the entire spectrum of carrier frequencies and PN sequences until an available channel is found. Obtaining a channel in a CDMA system can thus consume an excessive amount of time because of the need to tune to new carrier frequencies and search PN space for each carrier frequency.

Accordingly, there continues to exist a need in the art for improved methods of searching and acquiring communications channels.

SUMMARY OF THE INVENTION

It is therefore an object of the present invention to provide improved radiotelephone communications methods and terminals.

It is another object of the present invention to provide improved methods of scanning for an available channel and related terminals.

It is still another object of the present invention to provide methods which reduce the time to scan for an available channel and related terminals.

These and other objects are provided according to the present invention by storing a previously acquired communications channel in user terminal memory, searching for the previously acquired communications channel in the user terminal memory, and acquiring the previously acquired communications channel when the previously acquired communications channel is available. Because radiotelephone terminals are often used at a relatively high frequency within a relatively small number of service areas (cells), the communications channels associated with those most frequently used cells may have the highest probability of being available for use.

In other words, the user terminal can first search for channels which are most likely to be found before performing an exhaustive search of all possible channels thereby reducing the time required to acquire a channel for a significant number of communications. If the previously acquired channel is not available, the user terminal can search a list of specified channels with little added delay. Furthermore, the user terminal can store a plurality of previously acquired communications channels in memory so that the searching step comprises searching for the previously acquired communications channels.

In addition, the user terminal can store an access count for each of the previously acquired communications channels wherein the access count identifies a number of times the respective communications channel has been acquired by the user terminal. The searching step can thus include sequentially searching the previously acquired communications channels in order of a highest access count. In other words, those channels with the highest access counts are assumed to have the highest probability of being acquired, and these channels are thus searched first.

The user terminal can alternately identify a last acquired one of the previously acquired communications channels, and then first search for the last acquired communications channel. Here, it is assumed that the last acquired channel is the most likely channel to be acquired. Furthermore, the last acquired channel can be searched first followed by a search of channels in order of access count as discussed above. The previously acquired channels can also be sorted by geographic search identifier so that previously acquired communications channels having a common geographic search identifier can be searched.

The methods and terminals of the present invention can be advantageously used in a CDMA communications system wherein an exhaustive search of CDMA channels by carrier frequency and PN sequence can be time consuming. Accordingly, each of the previously acquired communications channels can be a CDMA channel, so that the user terminal stores a carrier frequency and a PN sequence for each of the previously acquired communications channels. The user terminal can also store a base station identification and a base station location for each of previously acquired communications channels. Accordingly, the user terminal can have multiple previously acquired channel entries with the same carrier frequency and PN sequence but with different base station locations. In other words, the user terminal can distinguish different CDMA channels having the same carrier frequency and PN sequence by the locations of the transmitting base stations.

The methods of the present invention can also be applied to dual use terminals adapted for communications with both CDMA and non-CDMA communications systems. In particular, the user terminal searches for non-CDMA communications channels when CDMA communications channels are not available. The terminal can preferably provide CDMA communications when a CDMA channel is available and provide non-CDMA communications when a CDMA channel is not available. Furthermore, the dual use terminal can periodically search for available CDMA communications channel when providing non-CDMA communications so that CDMA communications can be provided if a CDMA channel becomes available.

According to the methods and terminals of the present invention, the CDMA channels which are most likely to be available are searched first thereby reducing search times. In particular, the search can be prioritized by the most recently acquired channel(s), by the most frequently acquired channel(s), and/or by the location of the previously acquired channel(s).

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 2:
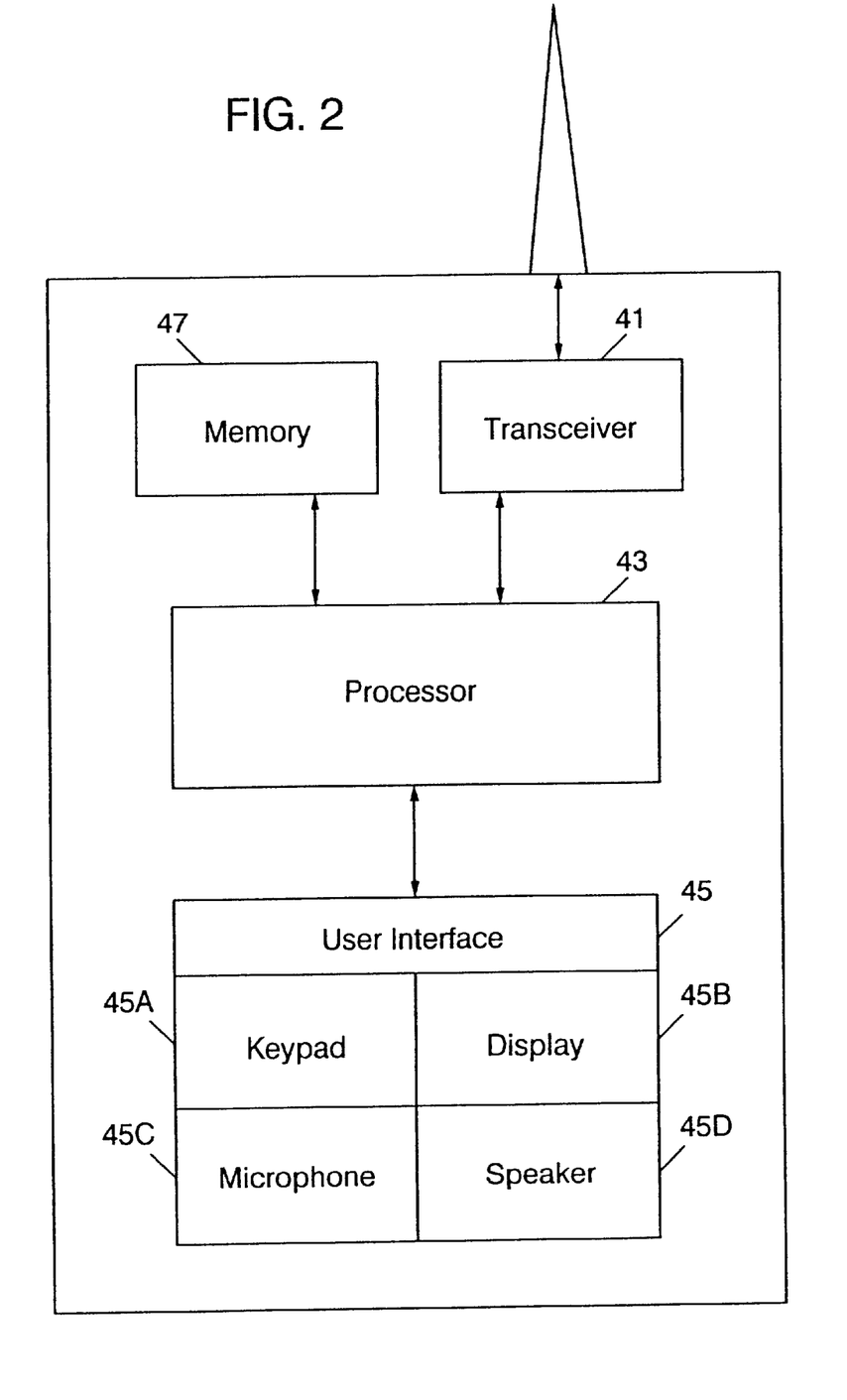
FIG. 2 is a block diagram of a user terminal according to the present invention.

A block diagram of a user terminal according to the present invention is illustrated in FIG. 2. As shown, the user terminal includes a transceiver 41 which transmits and receives communications to and from a radiotelephone communications system. A processor 43 is coupled to the transceiver 41 so that the processor can process communications transmitted and received by the transceiver. A user interface 45 is coupled to the processor 43, and this user interface can include a keypad 45A; a visual display 45B including a liquid crystal display (LCD) and/or a light emitting diode (LED) display; a microphone 45C; and a speaker 45D. Furthermore, the user terminal can be a radiotelephone, a portable computer, a personal digital assistant, or any other electronic device adapted for radiotelephone communications. Accordingly, the user terminal can provide radiotelephone communications with a radiotelephone communications system as will be understood by those having skill in the art.

The user terminal can also include a memory 47 coupled with the processor 43 wherein the memory is used according to the present invention to store previously acquired communications channels. More particularly, data relating to each previously acquired communications channel can be stored in the user terminal memory 47 wherein this data may include a plurality of fields as shown below in Table 2.

TABLE 2

| FIELD | DESCRIPTION |
|---|---|
| Carrier Frequency | The channel number of the CDMA carrier frequency which can change for a given base station/cell. |
| PN Sequence | The PN code (0-511) of the channel which can change for a given base station/cell. |
| SID System Identification | The system ID for the base station which should not change for a given base station/cell. |
| NID Network Identification | The Network ID for the base station which should not change for a given base station/cell. |
| Longitude/ Latitude | The coordinates of the base station which should not change for the base station/cell. |
| Neighbor List | A list of PN offsets for neighboring channels which may change and is of variable length. |
| Access Count | The number of times this base station/cell has been accessed. |
| Last Channel Acquired Flag | A Boolean value which is true if this was the last base station/cell the terminal was on, and false if it was not the last base station/cell the terminal was on. |
| Geographic Search Field | A field associating this base station/cell with one of a finite number of geographical search identifiers defined by the user. |
| Date/Time | The last day and time the base station/cell was accessed. |

As shown, the carrier frequency and PN sequence for an acquired CDMA channel can be saved. The user terminal memory can also be used to store the System IDentification (SID), the Network IDentification (NID), the longitude/latitude, and the neighbor list for the base station/cell transmitting the acquired CDMA channel. In addition, the user terminal memory can be used to store an access count indicating a number of times a CDMA channel has been acquired by the terminal from the transmitting base station/cell; a flag indicating if the CDMA channel transmitted by the base station/cell was the last channel acquired by the terminal; a geographic search field indicating a region within which the base station for the channel is located; and a date that the CDMA channel transmitted by the base station was last acquired.

For a given base station, the longitude/latitude, the System Identification, and the Network Identification should not change often, and these fields can be used to uniquely identify a base station as well as one of a plurality of sectored cells serviced by that base station. The carrier frequency and PN sequence for a CDMA channel transmitted by a base station, however, may change as channel allocations for the communications system change to accommodate, for example, shifts in system usage, and/or the addition of base stations and cells to the communications system. Furthermore, geographically isolated base stations can transmit channels having the same carrier frequency and PN sequence. Accordingly, the user terminal memory can include multiple entries with the same carrier frequency and PN sequence, but each of these entries should reflect a channel transmitted by different base stations. Moreover, a base station can provide service for a single cell, or a base station can provide service for a plurality of sectored cells.

Using the information in the user terminal memory, the processor can thus search first for the CDMA channel most likely to be acquired based on past usage of the user terminal. In particular, the processor can first search for CDMA channels transmitted by base stations in a given geographic region as indicated by the geographic search fields; CDMA channels transmitted by base stations having the highest access counts; and/or the last CDMA channel acquired as indicated by the last channel acquired flag. In addition, any CDMA channel transmitted by a base station that has not been acquired for a predetermined period of time can be deleted from memory thereby freeing up memory space for new channels.

If a previously acquired CDMA channel from user terminal memory cannot be acquired, the processor can then perform an exhaustive search of specified CDMA channels as in the prior art. Alternatively, available communications can be searched by interleaving specified communications channels (such as those listed in Table 1) with preferred communications channels (such as previously acquired communications channels). Furthermore, if the user terminal is a dual use terminal providing communications with both CDMA and non-CDMA communications systems, the processor can attempt to acquire a non-CDMA channel if a CDMA channel cannot be acquired in a reasonable period of time. Furthermore, an interleaved scan can be performed wherein alternating periods of time of predetermined length are used to respectively search for CDMA and non-CDMA channels.

As will be appreciated by those of skill in the art, the above described aspects of the present invention in FIG. 2 may be provided by hardware, software, or a combination of the above. While various components of the apparatus of the present invention such as the processor, memory, transceiver, and user interface have been illustrated in part as discrete elements in the Figure, they may, in practice, be implemented in whole or in part by a microcontroller including input and output ports and running software code, by custom or hybrid chips, by discrete components or by a combination of the above. In particular, memory 47 and processor 43 may be implemented as a segment of existing memory and additional code executing on an existing processor of the user terminal respectively. Furthermore, the means used to search for CDMA channels can be defined as a portion of the processor. Alternately, the searching means can be defined to include portions of the processor, transceiver, memory, and/or user interface.

Figures 3, 3A:
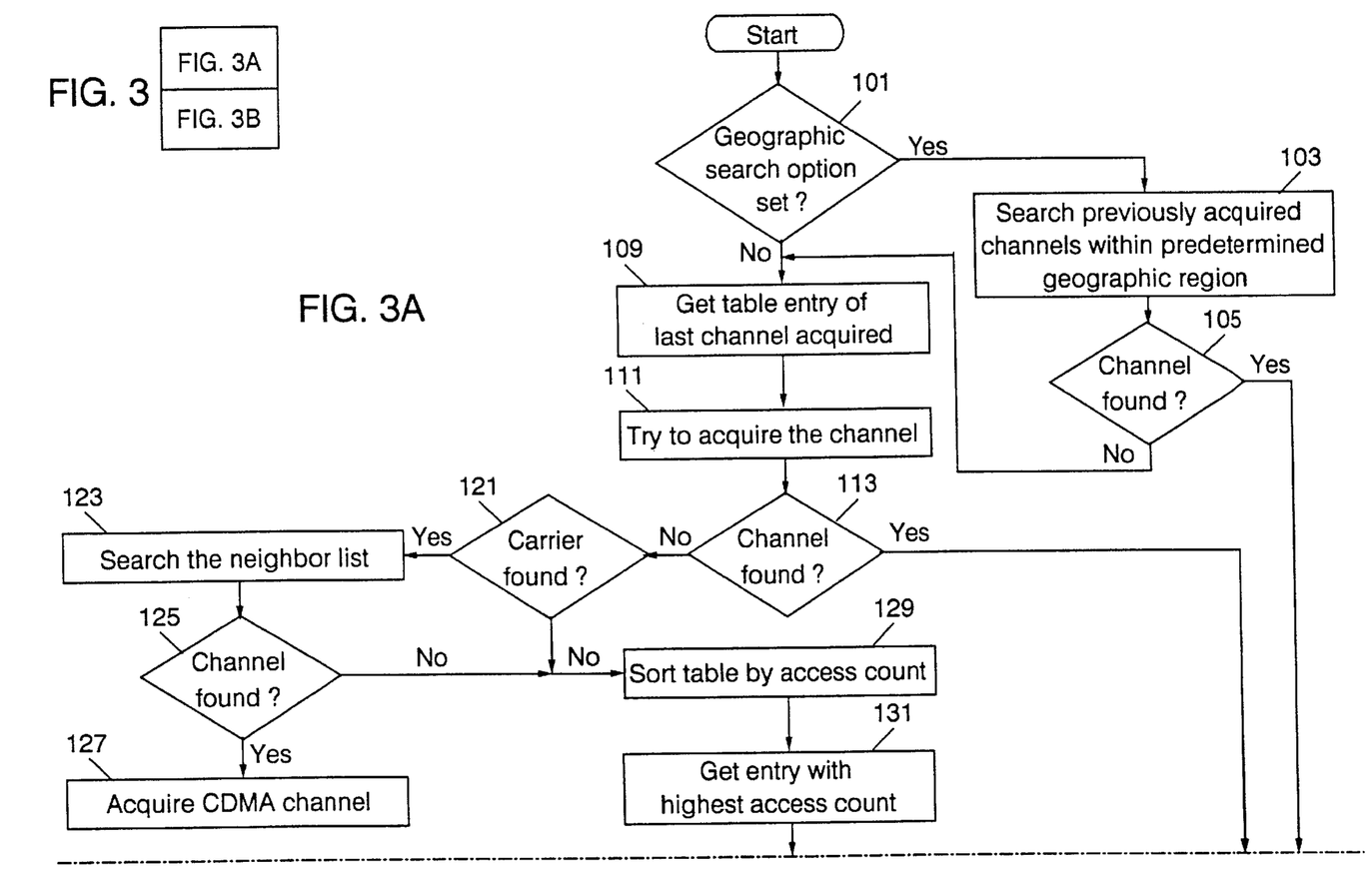
FIGS. 3–7 are flow charts illustrating operations of a user terminal according to the present invention.

Operations of a user terminal according to the present invention are illustrated in the flowcharts of FIGS. 3–7. In particular, the flowchart of FIG. 3 illustrates operations for acquiring a CDMA channel according to the present invention. When the user terminal is turned on, it will attempt to acquire a previously acquired CDMA channel using the information from the user terminal memory. If a geographic search option is set at block 101, the processor can sort the stored channels according to the geographic search field so that previously acquired channels transmitted by base stations within a predetermined geographic region are searched first at block 103. If a CDMA channel is found at block 105, the access count for the CDMA channel is incremented at block 117, and the channel is acquired at block 119. Otherwise, the search for a CDMA channel can continue.

Figure 3B:
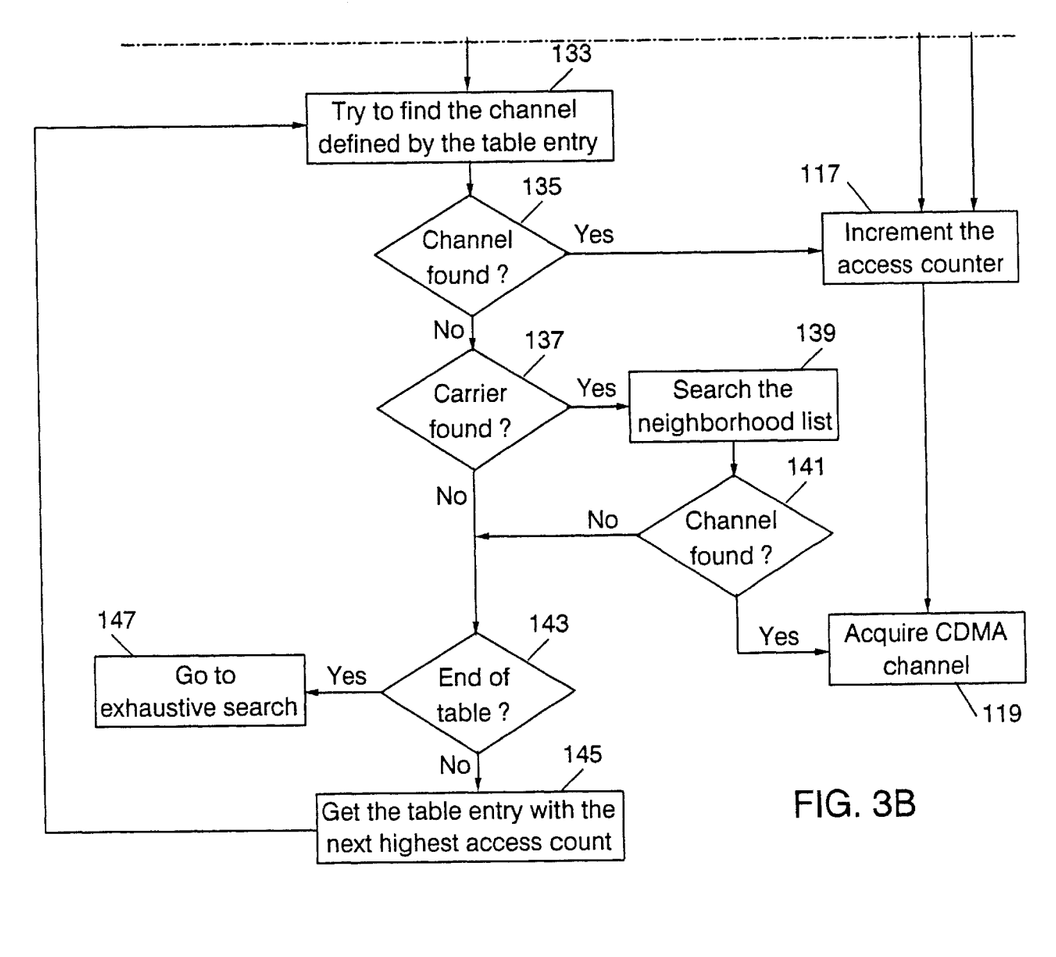

The geographic search option can be set manually by the user, for example, when the user travels with the user terminal to an area where the terminal has been used before. Alternately, the user terminal can set the geographic search option automatically to search, for example, previously acquired channels in the geographic region in which the user terminal was most recently used. The search for previously acquired channels in a predetermined geographic region can be done in sequential order, in order of access count values, and/or in order of the most recently acquired channels. If no channel is acquired during the search of previously acquired channels in the predetermined geographic region, the search can continue at block 109 as indicated in FIGS. 3A–3B. Alternately, the search can proceed directly to block 109 if the geographic search option is not set at block 101. Furthermore, the geographic information relating to the acquired channel can be used to sort telephone numbers in a user terminal directory called using that channel. Accordingly, the directory of telephone numbers can be sorted alphabetically and/or geographically.

At block 109, the processor identifies the last channel acquired using the last channel acquired flag from user terminal memory, and tries to acquire the channel at block 111. If the channel is found at block 113, the processor increments the access count for the channel at block 117 and acquires the channel at block 119. If the last acquired channel is not found at block 113, the processor determines if the carrier frequency for the last acquired channel can be found at block 121. If the carrier frequency can be found, the processor searches the neighbor list of channels corresponding to the last acquired channel at block 123. The neighbor list provides the PN sequences of channels for base stations neighboring the base station of the last acquired channel. If a channel is found from the neighboring list at block 125, the channel is acquired at block 127.

If the carrier is not found at block 121, or a channel is not found at block 125, the previously acquired channels from user terminal memory are sorted by access count at block 129. The processor then selects the previously acquired channel with the highest access count at block 131 and searches for the selected channel at block 133. If the selected channel is found at block 135, the processor increments the access count for the selected channel at block 117, and acquires the selected channel at block 119.

If the selected channel is not found at block 135, the processor tries to find the carrier frequency for the selected channel at block 137. If the carrier frequency is found, the processor searches for channels identified by the neighbor list for the selected channel at block 139. If one of the channels identified by the neighbor list is found at block 141, the channel is acquired at block 119. If the carrier for the selected channel is not found at block 137, or if a channel identified by the neighbor list is not found at block 141, the processor determines if all of the previously acquired channels have been searched at block 143. If all of the previously acquired channels have not been searched, the processor selects the previously acquired channel having the next highest access count and repeats the search at block 133.

If all of the previously acquired channels have been searched without finding one, the processor can proceed with an exhaustive search of all possible CDMA channels at block 147. The processor can start with the specified channel set provided above in FIG. 1 and then proceed sequentially through all remaining possible channels. Alternately, the processor can proceed sequentially through all remaining possible channels. In a dual use terminal, the terminal can proceed with non-CDMA operation, such as AMPS operation, if a CDMA channel cannot be found or if a predetermined period of time passes without finding a CDMA channel. Furthermore, an interleaved scan can be performed wherein alternating periods of time of predetermined length are used to respectively search for CDMA and non-CDMA channels. Dual use user terminals will be discussed in greater detail with reference to FIGS. 6 and 7.

Figure 4:
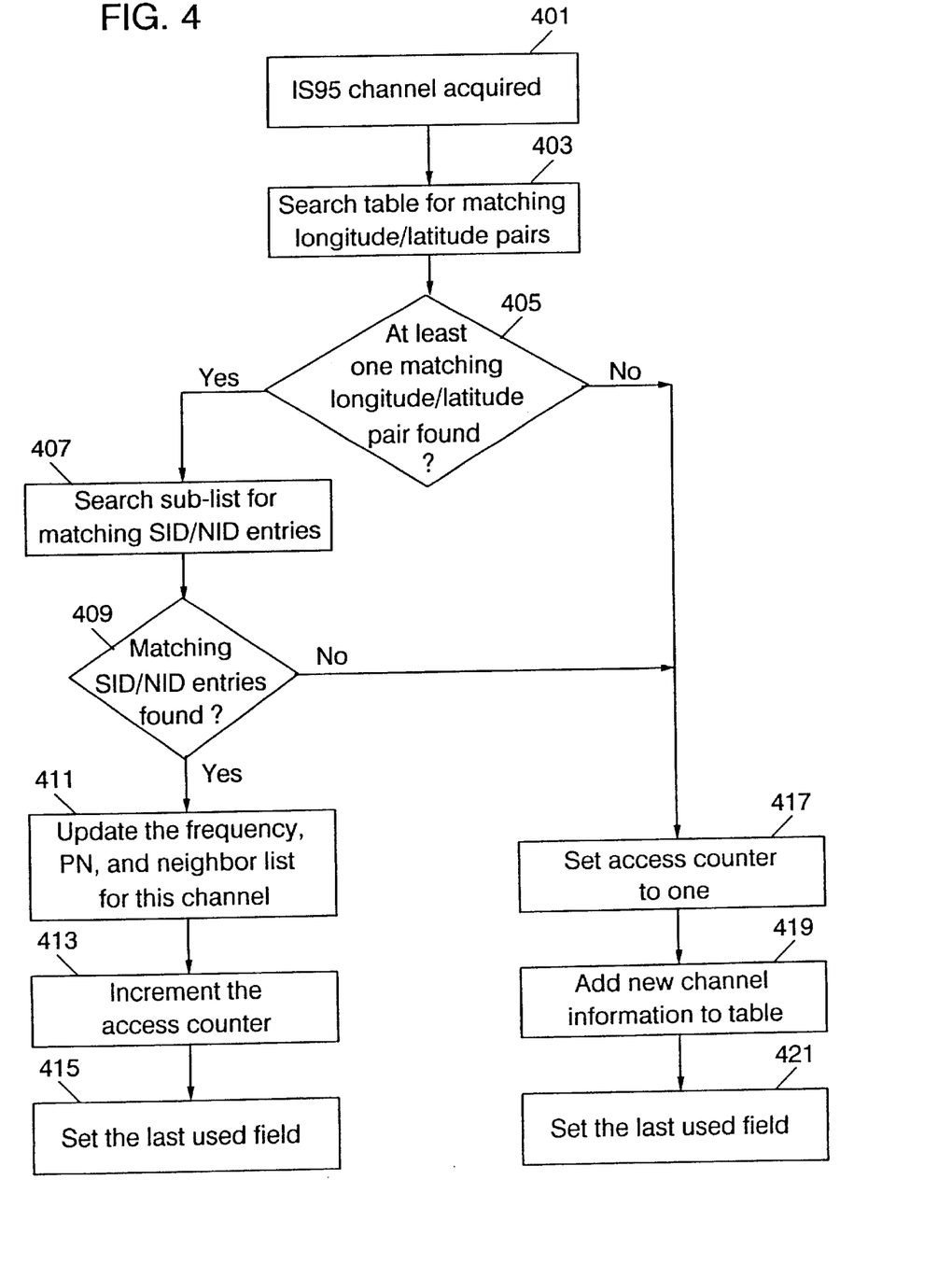

When a CDMA channel is acquired as discussed above with regard to blocks 107, 119, and 127, an entry for the acquired channel should be either added to the user terminal memory, or an existing entry for the acquired channel should be updated as discussed below with regard to FIG. 4. Accordingly, when a CDMA channel is acquired by the user terminal at block 401, the processor searches the user terminal memory for previously acquired channels transmitted by base stations having the same location as the base station transmitting the acquired channel at block 405. As will be understood by those having skill in the art, the longitude and latitude of a base station are transmitted by the base station in an IS-95 CDMA system so that the base station location can be determined by the receiving user terminal. The location of the base station of the acquired channel is checked against the base station locations of previously acquired channels because the carrier frequency and PN sequence of a base station of a previously acquired channel may have changed, and thus need to be updated.

If the base station location of the acquired CDMA channel matches that of a previously acquired CDMA channel(s), the processor checks the System Identification and Network Identification of the acquired channel against that of the previously acquired channel(s) with the matching base station location at block 409. The System Identification and Network Identification can be used to identify one of a plurality of sectored cells when a single base station is used to define a plurality of sectored cells. If the base station location, the System Identification, and the Network Identification of the acquired channel match that of a previously acquired channel at block 409, the cell in which the user terminal is located may have changed service from the carrier frequency and the PN sequence previously acquired to the carrier frequency and PN sequence presently acquired.

Accordingly, a new entry in the user terminal entry is not desired. Instead, the carrier frequency, the PN sequence, and the neighbor list should be undated for the entry in memory with the matching base station location, System Identification, and Network Identification at block 411. In addition, the access count for this entry should be incremented at block 413 to reflect the fact that the user terminal has received service within this cell before, and the last used flag should be set for this channel at block 415.

If the location of the base station for the acquired CDMA channel does not match that of any previously acquired CDMA channels at block 405, or if the System Identification and Network Identification do not match that of any previously acquired CDMA channels at block 409, the user terminal has acquired a channel in a new cell. Accordingly, a new entry should be made for this channel in user terminal memory as indicated at blocks 417, 419, and 421. In particular, the access count for the new entry is set to one at block 417; the carrier frequency, PN sequence, System Identification, Network Identification, location (longitude/latitude), neighbor list, and the data the system was accessed are entered at block 419; and the last used flag is set for the new entry at block 421.

Figure 5:
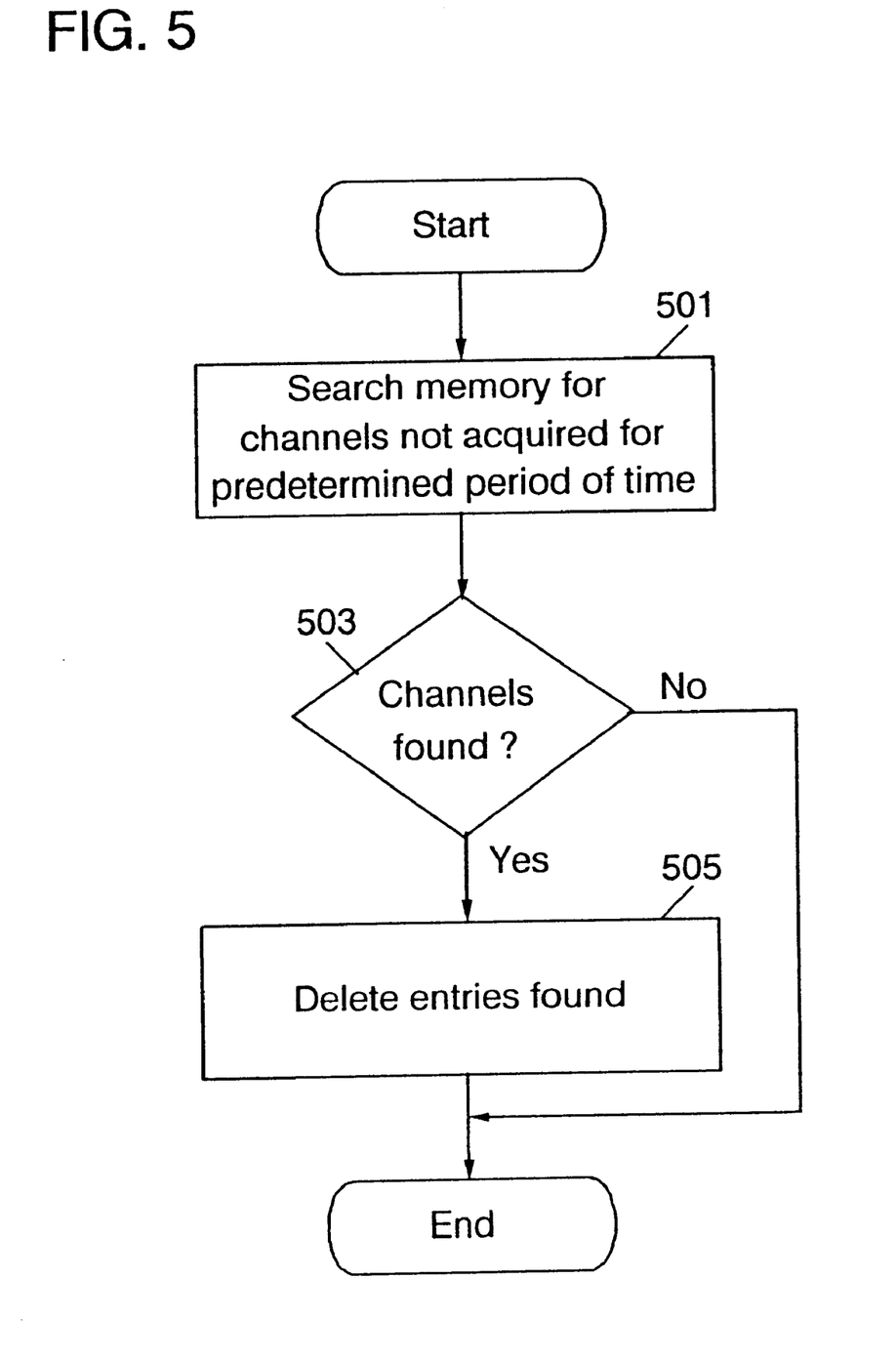

As discussed above, entries are added to memory when channels for new cells are acquired. Conversely, an entry for a previously acquired channel in user terminal memory can be aged out (deleted) if the previously acquired channel has not been acquired within a predetermined period of time as shown in FIG. 5. In particular, the processor can periodically (when the terminal is turned on for example) search the memory for previously acquired channels which have not been acquired within a predetermined period of time (six months for example) at block 501. This period can be set by the user. If any channels are found at block 503, the entries for these previously acquired channels can be deleted at block 505. If no channels are found at block 503, no channels are deleted.

By reducing the number of previously acquired channels, memory space can be made available for newly acquired channels. Furthermore, by aging out the least recently acquired channels, those channels which are not being used currently are deleted. In other words, the processor assumes that channels which have not been acquired recently are less likely to be acquired in the future. In addition, the memory can be aged when memory space is nearly full. In this situation, the processor can age out a predetermined number of the least recently acquired channels to make room for newly acquired channels. The user terminal can thus adapt its channel searches based on changing use patterns.

According to another aspect of the present invention, the CDMA channel acquisition operations of the present invention can be used in a user terminal adapted for communicating with both CDMA and non-CDMA (such as AMPS) communications systems. Accordingly, the user terminal may first attempt to obtain communications services from a CDMA system to obtain performance advantages of the CDMA system, and then attempt to obtain communications services from a non-(CDMA system, such as an AMPS system, if a CDMA system is not available. This hierarchy of operations provides that CDMA communications are obtained if available, and that non-CDMA communications are obtained as a back up. Furthermore, an interleaved scan can be performed wherein alternating periods of time of predetermined length are used to respectively search for CDMA and non-CDMA channels.

Figure 6:
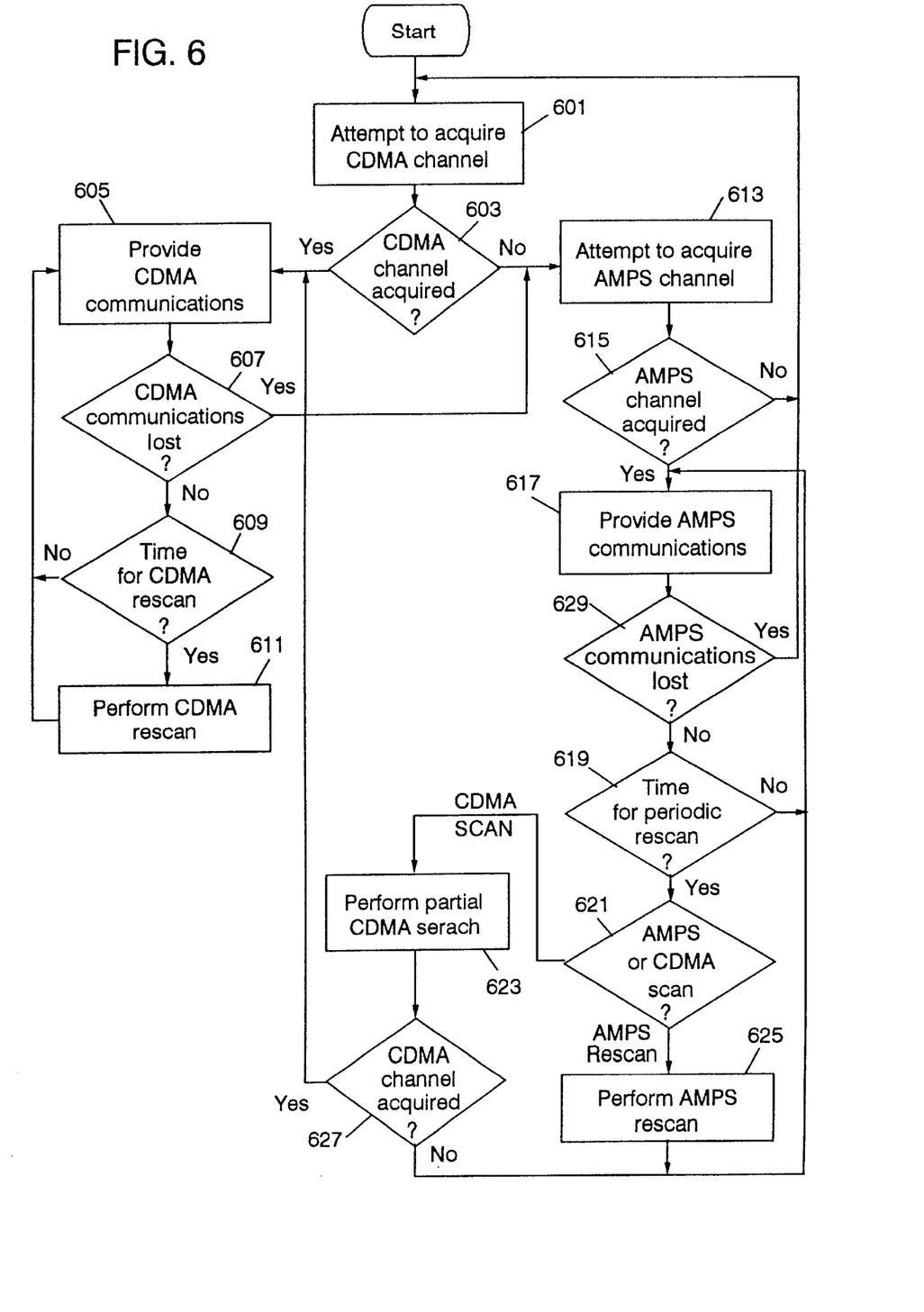

As shown in FIG. 6, the user terminal attempts to establish CDMA communications at block 601 as discussed in greater detail with regard to FIG. 2. If a CDMA channel is acquired at block 603, the user terminal provides CDMA communications with the CDMA communications system at block 605. As long as CDMA communications are not lost, the user terminal processor periodically performs a rescan of CDMA channels at blocks 609 and 611 to make sure communications are being maintained on the strongest available channel. If a CDMA channel is not acquired at block 603 or if CDMA communications are lost at block 607, the user terminal attempts to acquire an non-CDMA channel such as an AMPS channel at block 613. If an AMPS channel is acquired at block 615, AMPS communications are provided at block 617. If AMPS communications are lost at block 629, the user terminal can again attempt to acquire a CDMA channel at block 601.

During AMPS communications, the processor determines if it is time for a periodic rescan at block 619, and if it is time for a rescan, the processor determines if an AMPS rescan or a partial search of CDMA channels should be performed at block 621. In particular, a user terminal operating in an AMPS system periodically rescans the AMPS channels to make sure the strongest available AMPS channel is being used. According to the present invention, partial CDMA channel searches are interleaved with the conventional AMPS rescans so that CDMA communications can be provided if a CDMA channel becomes available. Accordingly, the processor periodically initiates a scan at block 619, and every predetermined number of scans performs a partial CDMA channel search at block 623. The other scan periods are used to perform AMPS rescans at block 625.

If a CDMA channel is acquired at block 627 responsive to the partial CDMA channel search at block 623, CDMA communications are provided at block 605. Alternately, if no CDMA channel is acquired, AMPS operations are continued at block 617. According to the present invention, CDMA channels are periodically searched during non-CDMA operations, so that CDMA communications can be provided if a CDMA channel becomes available. By interleaving partial CDMA searches between normally occurring AMPS rescans, the impact on AMPS operations can be reduced. The partial CDMA search of block 623 will now be discussed in greater detail with reference to FIG. 7.

Because the time allotted for the interleaved search of CDMA channels may not be sufficient to search for all CDMA channels, it may be desirable to coordinate the interleaved CDMA scans so that different CDMA channels are searched in consecutive scans. For example, an AMPS rescan period may be in the range of 42.6 ms to 83.2 ms. Furthermore, because a search of previously acquired CDMA channels was presumable performed without success at blocks 601 and 603 of FIG. 6 before providing AMPS communications, it may be desirable to search CDMA channels which have not been previously acquired by the user terminal during some of the interleaved CDMA searches.

Figure 7:
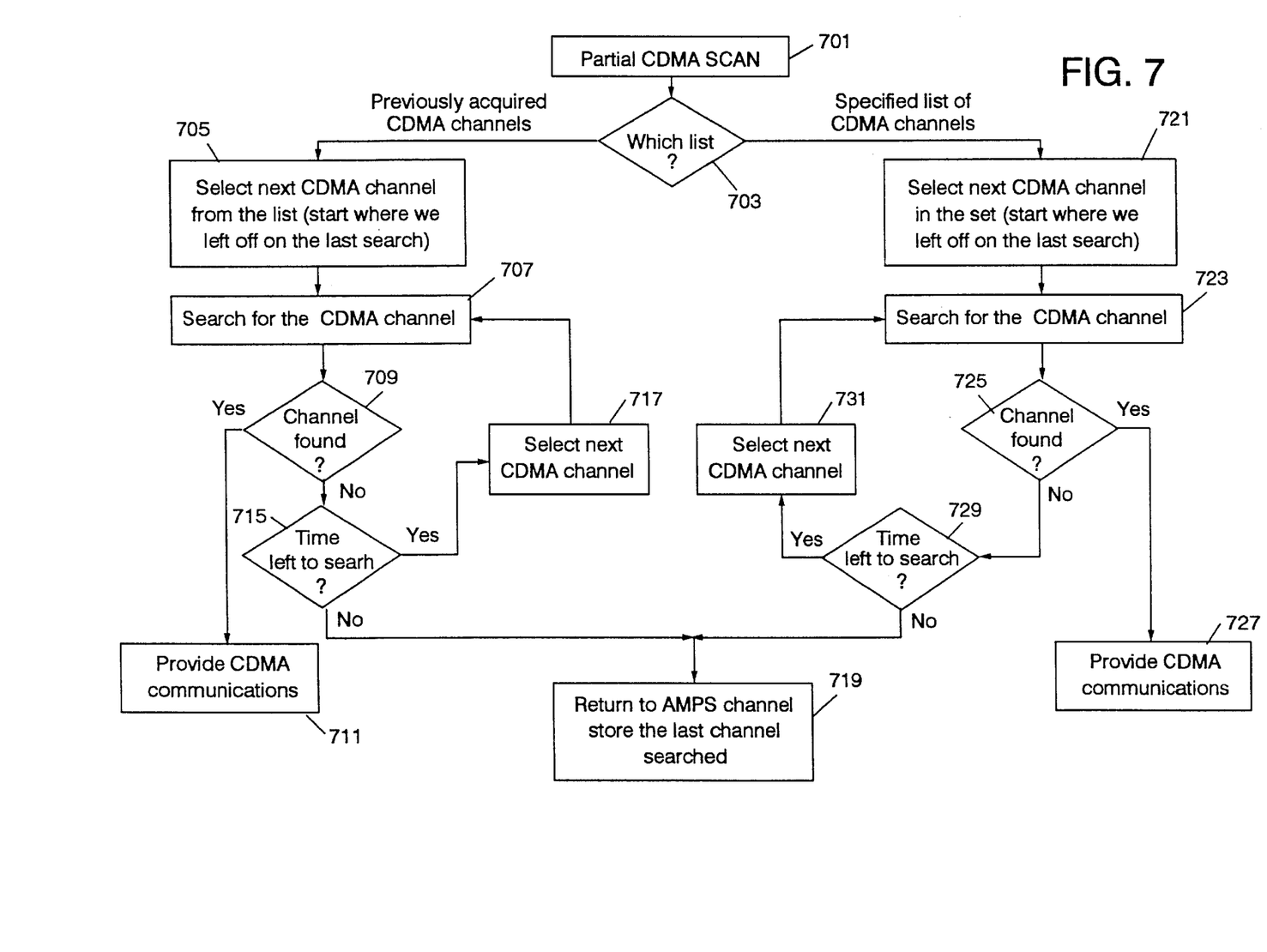

Accordingly, when an interleaved CDMA search is chosen at block 701 of FIG. 7, the processor decides at block 703 to perform either a partial search of previously acquired CDMA channels or a partial search of specified CDMA channels as indicated in Table 1. The partial CDMA searches can alternate between the two. Alternately, the list of previously acquired CDMA channels can be partially searched once for every predetermined number of CDMA searches with the remaining CDMA searches being used to search the specified list of CDMA channels.

If the list of previously acquired CDMA channels is chosen at block 703 for a partial search, the next channel from the list is selected at block 705, and the processor searches for this selected channel at block 707. If this is the first partial search of the list of previously acquired CDMA channels since acquiring AMPS communications, the first selected CDMA channel can be the first channel on the list. If this partial search has been preceded by a previous partial search of the list, the first selected CDMA channel selected can be the CDMA channel following the last CDMA channel searched in the previous search of the list. If the selected channel is found at block 709, the user terminal provides CDMA communications at block 711.

If the selected channel is not found, the processor checks if there is time left to search during the rescan period at block 715, and if there is time left, selects the next CDMA channel from the list of previously acquired CDMA channels at block 717. The processor searches for the next selected CDMA channel at block 707, and the cycle continues until either a CDMA channel is found or the time for the rescan period runs out. When the time for the rescan period runs out at block 715 without Finding a CDMA channel, the processor stores the last searched CDMA channel in memory, and returns to AMPS communications at block 719. Accordingly, the processor can begin the next partial search of previously acquired CDMA channels where the last partial search left off.

Alternately, if the processor chooses to perform a partial search of the specified list of CDMA channels at block 703 during the rescan period, the processor selects the next channel from the specified list of CDMA channels at block 721 and searches for the selected channel at block 723. If the selected channel is found at block 725, the processor provides CDMA communications at block 727. As before, if this is the first partial search of the specified list of CDMA channels since providing AMPS operations, the processor selects the first channel from the list. If this search has been preceded by a previous partial search of CDMA channels since providing AMPS operations, the processor selects the next channel on the list following the last channel searched in the previous search.

If the selected channel is not found, the processor determines if there is time remaining in the rescan period at block 729. If time remains, the processor selects the next CDMA channel from the list at block 731 and searches for the channel at block 723. The partial search of the specified list of CDMA channels continues until either a CDMA channel is found, or time for the rescan period runs out. If the time runs out without finding a CDMA channel, the processor stores the last searched channel from the specified list and returns to AMPS operations at block 719. Accordingly, the next partial search of the specified list can start where the previous search left off.

As discussed above, a portion of the AMPS rescan periods can be used to search for CDMA channels during AMPS operations in a dual use terminal. Accordingly, CDMA communications can be provided if a CDMA channel becomes available during AMPS operations. Because the list of specified CDMA channels is likely to be longer than the list of previously acquired CDMA channels, it may be desirable to perform partial searches of the specified list more frequently than searches of the list of previously acquired channels are performed.

The present invention has been described above with respect to FIGS. 3–7 with reference to flowcharts illustrating operations of the present invention. It will be understood that each block of the flowchart, and combinations of blocks in the flowchart, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based systems which perform the specified functions or steps, or combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims. While the present invention has been discussed above with reference to a satellite radiotelephone communications system, the methods, systems, and terminals of the present invention can also be applied in a terrestrial cellular radiotelephone communications system. The methods, systems, and terminals of the present invention can also be applied with dual mode terminals capable of providing communications with both satellite radiotelephone communications systems and terrestrial radiotelephone communications systems.

That which is claimed is:

1. A method of acquiring communications for a user terminal with a radiotelephone communications system having a plurality of communications channels, said method comprising the steps of:

storing a previously acquired communications channel in a user terminal memory;

searching for said previously acquired communications channel in said user terminal memory;

acquiring said previously acquired communications channel when said previously acquired communications channel is available; and providing radiotelephone communications between the user terminal and the radiotelephone communications system over said previously acquired communications channel when said previously acquired communications channel is available;

wherein said storing step comprises storing a plurality of previously acquired communications channels in said user terminal memory, and wherein said searching step comprises searching for said plurality of previously acquired communications channels; and wherein said storing step comprises storing an access count for each of said previously acquired communications channels wherein said access count identifies a number of times said respective communications channel has been acquired by said user terminal, and wherein said searching step comprises sequentially searching said previously acquired communications channels in order of a highest access count.

2. A method according to claim 1 wherein said storing step comprises identifying a last acquired one of said previously acquired communications channels, and wherein said searching step comprises first searching for said last acquired communications channel.

3. A method according to claim 1 wherein each of said plurality of previously acquired communications channels comprises a Code Division Multiple Access (CDMA) communications channel, and wherein said storing step comprises storing a carrier frequency and a PN sequence for each of said previously acquired communications channels.

4. A method according to claim 1 further comprising the step of deleting one of said previously acquired communications channels when said previously acquired communications channel has not been reacquired within a predetermined period of time.

5. A method according to claim 1 wherein said storing step comprises storing a list of neighboring communications channels for cells neighboring said previously acquired communications channel, said method further comprising the step of:

searching said neighboring communications channels when said previously identified communications channel is not available.

6. A method according to claim 1 further comprising the step of:

acquiring a new communications channel when said previously acquired communications channels are not available.

7. A method of acquiring communications for a user terminal with a radiotelephone communications system having a plurality of communications channels, said method comprising the steps of:

storing a previously acquired communications channel in a user terminal memory;

searching for said previously acquired communications channel in said user terminal memory;

acquiring said previously acquired communications channel when said previously acquired communications channel is available; and providing radiotelephone communications between the user terminal and the radiotelephone communications system over said previously acquired communications channel when said previously acquired communications channel is available;

wherein said storing step comprises storing a plurality of previously acquired communications channels in said user terminal memory, and wherein said searching step comprises searching for said plurality of previously acquired communications channels; and wherein said storing step comprises storing a geographic search identifier for each of said previously acquired communications channels, and wherein said searching step comprises searching for previously acquired communications channels having a common geographic search identifier.

8. A method of acquiring communications for a user terminal with a radiotelephone communications system having a plurality of communications channels, said method comprising the steps of:

storing a previously acquired communications channel in a user terminal memory;

searching for said previously acquired communications channel in said user terminal memory;

acquiring said previously acquired communications channel when said previously acquired communications channel is available; and providing radiotelephone communications between the user terminal and the radiotelephone communications system over said previously acquired communications channel when said previously acquired communications channel is available;

wherein said storing step comprises storing a plurality of previously acquired communications channels in said user terminal memory, and wherein said searching step comprises searching for said plurality of previously acquired communications channels;

wherein each of said plurality of previously acquired communications channels comprises a Code Division Multiple Access (CDMA) communications channel, and wherein said storing step comprises storing a carrier frequency and a PN sequence for each of said previously acquired communications channels;

wherein said storing step further comprises storing a base station identification and a base station location for each of said previously acquired communications channels.

9. A method according to claim 8 further comprising the steps of:

obtaining a base station location for an acquired communications channel;

comparing said base station location for said acquired communications channel with said base station locations for said previously acquired communications channels;

identifying a previously acquired communications channel having a matching base station location matching said base station of said acquired communications channel; and updating said carrier frequency and said PN sequence for said previously acquired communications channel having said matching base station location.

10. A method of acquiring communications for a user terminal with a radiotelephone communications system having a plurality of communications channels, said method comprising the steps of:

storing a previously acquired communications channel in a user terminal memory;

searching for said previously acquired communications channel in said user terminal memory;

acquiring said previously acquired communications channel when said previously acquired communications channel is available;

providing radiotelephone communications between the user terminal and the radiotelephone communications system over said previously acquired communications channel when said previously acquired communications channel is available wherein said storing step comprises storing a plurality of previously acquired communications channels in said user terminal memory, and wherein said searching step comprises searching for said plurality of previously acquired communications channels wherein each of said plurality of previously acquired communications channels comprises a Code Division Multiple Access (CDMA) communications channel, and wherein said storing step comprises storing a carrier frequency and a PN sequence for each of said previously acquired communications channels;

searching for an available CDMA communications channel not previously acquired when said previously acquired CDMA communications channels are not available;

searching for non-CDMA communications channels when said CDMA communications channels are not available; and acquiring a non-CDMA communications channel when one of said searched non-CDMA communications channels is available.

11. A method according to claim 10 further comprising the steps of:

providing communications over said acquired non-CDMA communications channel; and periodically searching for available CDMA communications channels.

12. A method according to claim 11 wherein said periodically searching step comprises searching said previously acquired CDMA communications channels.

13. A method according to claim 12 wherein said periodically searching step further comprises searching CDMA communications channels which have not been previously acquired.

14. A user terminal for use with a radiotelephone communications system having a plurality of communications channels, said user terminal comprising:

a transceiver for transmitting and receiving radiotelephone communications to and from the radiotelephone communications system;

user terminal memory for storing a previously acquired communications channel; and searching means coupled to said transceiver and said user terminal wherein said searching means searches for said previously acquired communications channel in said user terminal memory and which acquires said previously acquired communications channel when said previously acquired communications channel is available;

wherein said user terminal memory stores a plurality of previously acquired communications channels, and wherein said searching means searches for said plurality of previously acquired communications channels;

wherein said user terminal memory stores an access count for each of said previously acquired communications channels wherein said access count identifies a number of times said respective communications channel has been acquired by said user terminal, and wherein said searching means sequentially searches said previously acquired communications channels in order of a highest access count.

15. A user terminal according to claim 14 wherein said user terminal memory identifies a last acquired one of said previously acquired communications channels, and wherein said searching means first searches for said last acquired communications channel.

16. A user terminal according to claim 14 wherein each of said plurality of previously acquired communications channels comprises a Code Division Multiple Access (CDMA) communications channel, and wherein said user terminal memory stores a carrier frequency and a PN sequence for each of said previously acquired communications channels.

17. A user terminal according to claim 14 wherein said user terminal memory stores a list of neighboring communications channels for cells neighboring said previously acquired communications channel, and wherein said searching means searches said neighboring communications channels when said previously identified communications channel is not available.

18. A user terminal according to claim 14 wherein said searching means acquires a new communications channel when said previously acquired communications channels are not available.

19. A user terminal according to claim 14 wherein said user terminal deletes one of said previously acquired communications channels when said previously acquired communications channel has not been reacquired within a predetermined period of time.

20. A user terminal for use with a radiotelephone communications system having a plurality of communications channels, said user terminal comprising:

a transceiver for transmitting and receiving radiotelephone communications to and from the radiotelephone communications system;

user terminal memory for storing a previously acquired communications channel; and searching means coupled to said transceiver and said user terminal wherein said searching means searches for said previously acquired communications channel in said user terminal memory and which acquires said previously acquired communications channel when said previously acquired communications channel is available;

wherein said user terminal memory stores a plurality of previously acquired communications channels, and wherein said searching means searches for said plurality of previously acquired communications channels, wherein said user terminal memory stores a geographic search identifier for each of said previously acquired communications channels, and wherein said searching means searches for previously acquired communications channels having a common geographic search identifier.

21. A user terminal for use with a radiotelephone communications system having a plurality of communications channels, said user terminal comprising:

a transceiver for transmitting and receiving radiotelephone communications to and from the radiotelephone communications system;

user terminal memory for storing a previously acquired communications channel; and searching means coupled to said transceiver and said user terminal wherein said searching means searches for said previously acquired communications channel in said user terminal memory and which acquires said previously acquired communications channel when said previously acquired communications channel is available;

wherein said user terminal memory stores a plurality of previously acquired communications channels, and wherein said searching means searches for said plurality of previously acquired communications channels;

wherein each of said plurality of previously acquired communications channels comprises a Code Division Multiple Access (CDMA) communications channel, and wherein said user terminal memory stores a carrier frequency and a PN sequence for each of said previously acquired communications channels, wherein said user terminal memory further stores a base station identification and a base station location for each of said previously acquired communications channels.

22. A user terminal according to claim 21 wherein said searching means obtains a base station location for an acquired communications channel, compares said base station location for said acquired communications channel with said base station locations for said previously acquired communications channels, and identifies a previously acquired communications channel having a matching base station location matching said base station of said acquired communications channel, and wherein said user terminal memory updates said carrier frequency and said PN sequence for said previously acquired communications channel having said matching base station location.

23. A user terminal for use with a radiotelephone communications system having a plurality of communications channels, said user terminal comprising:

a transceiver for transmitting and receiving radiotelephone communications to and from the radiotelephone communications system;

user terminal memory for storing a previously acquired communications channel; and searching means coupled to said transceiver and said user terminal wherein said searching means searches for said previously acquired communications channel in said user terminal memory and which acquires said previously acquired communications channel when said previously acquired communications channel is available;

wherein said user terminal memory stores a plurality of previously acquired communications channels, and wherein said searching means searches for said plurality of previously acquired communications channels;

wherein each of said plurality of previously acquired communications channels comprises a Code Division Multiple Access (CDMA) communications channel, and wherein said user terminal memory stores a carrier frequency and a PN sequence for each of said previously acquired communications channels;

wherein said searching means searches for an available CDMA communications channel not previously acquired when said previously acquired CDMA communications channels are not available, wherein said searching means searches for non-CDMA communications channels when said CDMA communications channels are not available, and wherein said searching means acquires a non-CDMA communications channel when one of said searched non-CDMA communications channels is available.

24. A user terminal according to claim 23 wherein said transceiver provides communications over said acquired non-CDMA communications channel, and wherein said searching means periodically searches for available CDMA communications channels while maintaining said communications over said acquired non-CDMA communications channel.

25. A user terminal according to claim 24 wherein said searching means periodically searches said previously acquired CDMA communications channels.

26. A user terminal according to claim 25 wherein said searching means periodically searches CDMA communications channels which have not been previously acquired.

27. A method of acquiring communications channels for a user terminal with a radiotelephone communications system having a plurality of communications channels, said method comprising the steps of:

storing a list of previously acquired communications channels in a user terminal memory;

storing a list of specified communications channels in said user terminal memory wherein said previously acquired communications channels are a subset of said specified communications channels; and searching for an available communications channel using said list of previously acquired communications channels wherein partial searches of said specified communications channels are interleaved with partial searches of said previously acquired communications channels.

28. A method according to claim 27 wherein said searching step is followed by the steps of:

acquiring one of said communications channels; and providing radiotelephone communications between the user terminal and the radiotelephone communications system over said acquired communications channel.

29. A method according to claim 28 wherein said acquiring step is followed by the step of:

adding said acquired communications channel to said list of preferred communications channels.

30. A user terminal for providing communications with a radiotelephone communications system having a plurality of communications channels, said user terminal comprising:

a transceiver for transmitting and receiving radiotelephone communications to and from the radiotelephone communications system;

user terminal memory for storing a list of previously acquired communications channels and for storing a list of specified communications channels wherein said previously acquired communications channels are a subset of said specified communications channels; and searching means coupled to said transceiver and said user terminal memory wherein said searching means searches for an available communications channel using said lists of previously acquired and specified communications channels wherein said specified communications channels are interleaved with said previously acquired communications channels.

31. A user terminal according to claim 30 further comprising:

means for acquiring one of said communications channels and providing radiotelephone communications between the user terminal and the radiotelephone communications system over said acquired communications channel.

32. A user terminal according to claim 31 further comprising:

means for adding said acquired communications channel to said list of preferred communications channels.

* * * * *